(12) United States Patent
Malladi et al.

(10) Patent No.: US 11,281,554 B2
(45) Date of Patent: Mar. 22, 2022

(54) SYSTEM AND METHOD FOR IN-MEMORY COMPUTATION

(71) Applicant: Samsung Electronics Co., Ltd., Suwon-si (KR)

(72) Inventors: Krishna T. Malladi, San Jose, CA (US); Wenqin Huangfu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 16/914,119

(22) Filed: Jun. 26, 2020

(65) Prior Publication Data

US 2021/0294711 A1 Sep. 23, 2021

Related U.S. Application Data

(60) Provisional application No. 62/990,919, filed on Mar. 17, 2020.

(51) Int. Cl.
*G06F 11/30* (2006.01)
*G06F 11/34* (2006.01)

(52) U.S. Cl.
CPC ...... *G06F 11/3037* (2013.01); *G06F 11/3428* (2013.01)

(58) Field of Classification Search
CPC .......................... G06F 11/3037; G06F 11/3428
USPC ....................................................... 702/182
See application file for complete search history.

(56) References Cited

U.S. PATENT DOCUMENTS

| | | | |
|---|---|---|---|
| 7,966,475 B2 | 6/2011 | Stuttard et al. | |
| 10,241,972 B2 | 3/2019 | Chen et al. | |
| 2016/0224465 A1 | 8/2016 | Morad et al. | |
| 2018/0197067 A1 | 7/2018 | Mody et al. | |
| 2019/0004794 A1 | 1/2019 | Raghavan et al. | |
| 2019/0042542 A1 | 2/2019 | Narayanamoorthy et al. | |
| 2019/0180170 A1 | 6/2019 | Huang et al. | |
| 2019/0205737 A1 | 7/2019 | Bleiweiss et al. | |
| 2019/0213005 A1 | 7/2019 | Temam et al. | |
| 2020/0243154 A1* | 7/2020 | Sity | G11C 29/006 |

FOREIGN PATENT DOCUMENTS

WO    WO 2017/201627 A1    11/2017

* cited by examiner

*Primary Examiner* — John H Le
(74) *Attorney, Agent, or Firm* — Lewis Roca Rothgerber Christie LLP

(57) ABSTRACT

A method for computing. In some embodiments, the method includes: calculating an advantage score of a first computing task, the advantage score being a measure of an extent to which a plurality of function in memory circuits is capable of executing the first computing task more efficiently by than one or more extra-memory processing circuits, the first computing task including instructions and data; in response to determining that the advantage score of the first computing task is less than a first threshold, executing the first computing task by the one or more extra-memory processing circuits; and in response to determining that the first computing task is at least equal to the first threshold: compiling the instructions for execution by the function in memory circuits; formatting the data for the function in memory circuits; and executing the first computing task, by the function in memory circuits.

20 Claims, 12 Drawing Sheets

| ID | operation | Description |
|---|---|---|
| 0 | Rop = GIO | Column read data stored in Rop |
| 1 | Rop = WIO | Column write data stored in Rop |
| 2 | Rop = Rz | Copy ALU output Rz to Rop |
| 3 | GIO = Rz | Write back into Bank |
| 4 | RIO = GIO | Normal Read to DQ output |
| 5 | RIO = Rz | Drive Rz to DQ output |
| 6 | Rz = Rop (op) GIO | Operation with Rop and data from bank |
| 7 | Rz = Rop (op) WIO | Operation with Rop and broadcast data |
| 8 | Rz = WIO (op) GIO | Operation with broadcast data and bank |
| 9 | GIO = WIO | Normal Write from DQ input |

FIG. 1C

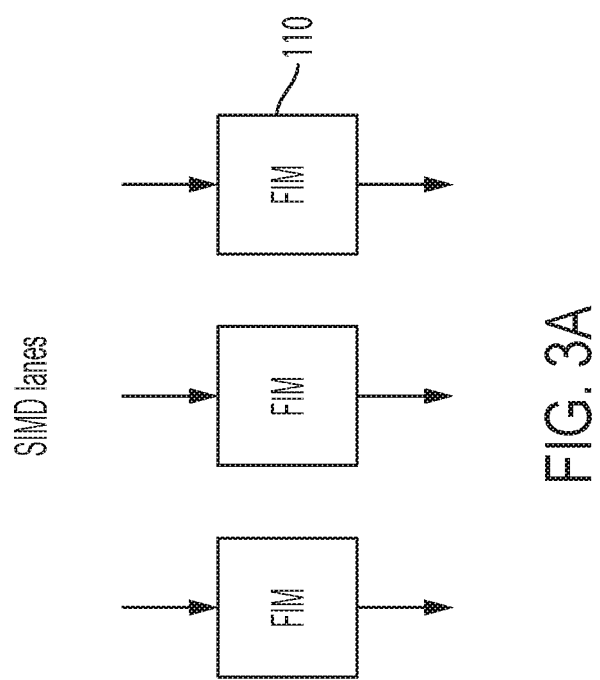

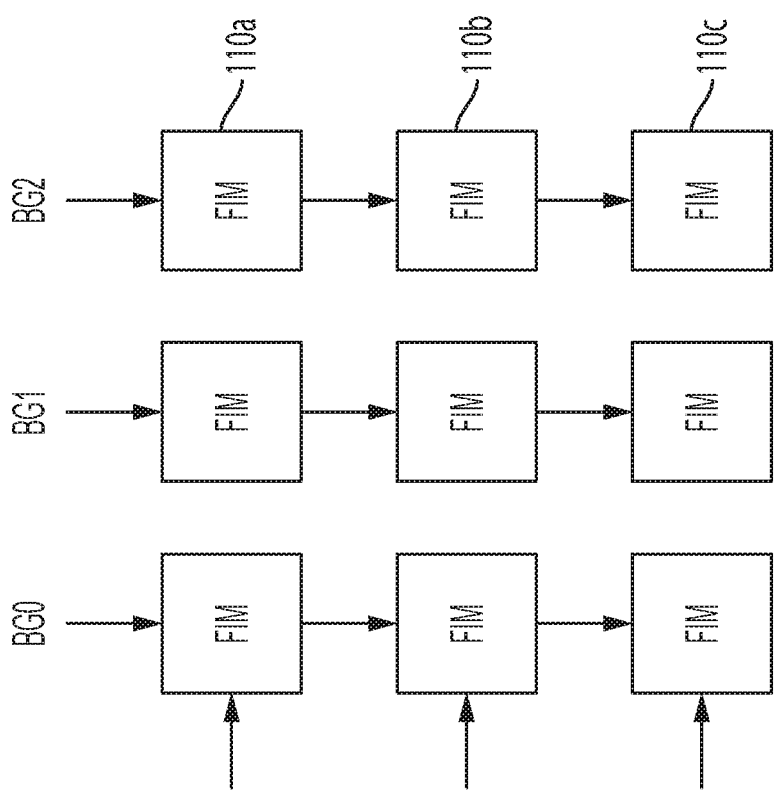

SYSTEM AND METHOD FOR IN-MEMORY COMPUTATION

CROSS-REFERENCE TO RELATED APPLICATION(S)

The present application claims priority to and the benefit of U.S. Provisional Application No. 62/990,919, filed Mar. 17, 2020, entitled "SYSTEM AND METHOD FOR IN-MEMORY COMPUTATION", the entire content of which is incorporated herein by reference.

FIELD

One or more aspects of embodiments according to the present disclosure relate to data processing, and more particularly to in-memory computation.

BACKGROUND

In-memory computation (or "in-memory compute") may be employed to reduce performance degradation due to memory access bottlenecks. Using in-memory computation effectively, however, may be challenging, in part because software may be heterogenous, including portions that are well suited for in-memory computation and also including portions that are poorly suited for in-memory computation.

Thus, there is a need for an improved system and method for in-memory computation.

SUMMARY

According to an embodiment of the present invention, there is provided a method for computing, the method including: calculating an advantage score of a first computing task, the advantage score being a measure of an extent to which a plurality of function in memory circuits is capable of executing the first computing task more efficiently by than one or more extra-memory processing circuits, the first computing task including instructions and data; in response to determining that the advantage score of the first computing task is less than a first threshold, executing the first computing task by the one or more extra-memory processing circuits; and in response to determining that the first computing task is at least equal to the first threshold: compiling the instructions for execution by the function in memory circuits; formatting the data for the function in memory circuits; and executing the first computing task, by the function in memory circuits.

In some embodiments, the advantage score is based on one or more measures of comparative performance for comparing the expected performance of: execution of the first computing task by the extra-memory processing circuits, and execution of the first computing task by the function in memory circuits.

In some embodiments, a measure of comparative performance of the one or more measures of comparative performance is an average number of floating-point operations per byte retrieved from memory and per byte stored in memory.

In some embodiments, a first measure of comparative performance of the one or more measures of comparative performance is a cache hit rate during execution of the first computing task by the extra-memory processing circuits.

In some embodiments, a second measure of comparative performance of the one or more measures of comparative performance is an average number of floating-point operations per byte retrieved from memory and per byte stored in memory.

In some embodiments, the advantage score is a decreasing number of the first measure of performance and a decreasing function of the second measure of performance.

In some embodiments, a measure of comparative performance of the one or more measures of comparative performance is the total number of floating-point operations of the first computing task.

In some embodiments, the calculating of the advantage score of the first computing task includes calculating the advantage score of the first computing task by static analysis of source code for the first computing task.

In some embodiments, the calculating of the advantage score of the first computing task includes calculating of the advantage score of the first computing task at run time.

In some embodiments, the calculating of the advantage score, of the first computing task, at run time, includes: executing a second computing task, analogous to the first computing task, on the extra-memory processing circuits; and calculating an advantage score, of the second computing task, based on values of performance counters of the extra-memory processing circuits.

In some embodiments, the executing of the first computing task, by the function in memory circuits, includes executing the first computing task, by the function in memory circuits arranged in a single instruction, multiple data configuration.

In some embodiments, the executing of the first computing task, by the function in memory circuits, includes executing the first computing task, by the function in memory circuits arranged in a systolic configuration.

In some embodiments, a function in memory circuit of the plurality of function in memory circuits is on a semiconductor chip with a dynamic random-access memory.

In some embodiments, a function in memory circuit of the plurality of function in memory circuits includes: a plurality of registers, a plurality of multiplexers, and an arithmetic logic unit.

According to an embodiment of the present invention, there is provided a system for computing, including: a host processing circuit; and a memory including a plurality of function in memory circuits, the host processing circuit being configured to: calculate an advantage score of a first computing task, the advantage score being a measure of an extent to which a plurality of function in memory circuits is capable of executing the first computing task more efficiently by than one or more extra-memory processing circuits, the first computing task including instructions and data; in response to determining that the advantage score of the first computing task is less than a first threshold, execute the first computing task by the one or more extra-memory processing circuits; and in response to determining that the first computing task is at least equal to the first threshold: compile the instructions for execution by the function in memory circuits; format the data for the function in memory circuits; and cause the first computing task to be executed by the function in memory circuits.

In some embodiments, the function in memory circuits are arranged in a single instruction, multiple data configuration.

In some embodiments, the function in memory circuits are arranged in a systolic configuration.

In some embodiments, a function in memory circuit of the plurality of function in memory circuits includes: a plurality of registers, a plurality of multiplexers, and an arithmetic logic unit.

In some embodiments, the calculating of the advantage score of the first computing task includes calculating of the advantage score of the first computing task by static analysis of source code for the first computing task.

According to an embodiment of the present invention, there is provided a system for computing, including: means for processing; and a memory including a plurality of function in memory circuits, the means for processing being configured to: calculate an advantage score of a first computing task, the advantage score being a measure of an extent to which a plurality of function in memory circuits is capable of executing the first computing task more efficiently by than one or more extra-memory processing circuits, the first computing task including instructions and data; in response to determining that the advantage score of the first computing task is less than a first threshold, execute the first computing task by the one or more extra-memory processing circuits; and in response to determining that the first computing task is at least equal to the first threshold: compile the instructions for execution by the function in memory circuits; format the data for the function in memory circuits; and cause the first computing task to be executed by the function in memory circuits.

BRIEF DESCRIPTION OF THE DRAWINGS

These and other features and advantages of the present disclosure will be appreciated and understood with reference to the specification, claims, and appended drawings wherein:

FIG. 1C is a table of instructions for execution by a function in memory circuit, according to an embodiment of the present disclosure;

FIG. 3A is a function in memory configuration in which multiple function in memory circuits are arranged as a single instruction, multiple data processor, according to an embodiment of the present disclosure;

FIG. 3B is a function in memory configuration in which multiple function in memory circuits are arranged in a systolic array, according to an embodiment of the present disclosure;

DETAILED DESCRIPTION

The detailed description set forth below in connection with the appended drawings is intended as a description of exemplary embodiments of a system and method for in-memory compute provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

The use of function in memory circuits may be challenging, in part because software may be heterogenous, including portions that are well suited for in-memory computation and also including portions that are poorly suited for in-memory computation. Moreover, data formats used to store data for large, repetitive computations (e.g., matrix multiplication) to be performed by a central processing unit (CPU) or graphics processing unit (GPU)) may be poorly suited for use by function in memory circuits, because the data path between a function in memory circuit and the memory cells of a memory may have characteristics that are different from those of a data path between a memory and a CPU or a GPU.

In some embodiments, these challenges are mitigated or overcome by a system and method for function in memory computing as described herein, for some embodiments. The function in memory circuits may be implemented directly on the memory chips, e.g., fabricated on the same substrates (e.g., on the same silicon wafers) as the memory cells, or they may be implemented on separate chips, near the memory chips. A method for using function in memory circuits may include analyzing various computing tasks within the code to be executed to assess whether each computing task may be more efficiently executed by the function in memory circuits or by an extra-memory processing circuit (e.g., a CPU or a GPU). If the system determines that the computing task is not suitable for execution by function in memory circuits (e.g., if the computing task can be more efficiently executed by a CPU or a GPU), the computing task is executed by one or more extra-memory processing circuits. If the system determines that the computing task is suitable for execution by function in memory circuits, the instructions of the computing task are compiled for execution by the function in memory circuits, the data to be processed by the computing task are formatted for the function in memory circuits, and the computing task is executed by the function in memory circuits.

Figure 1A:
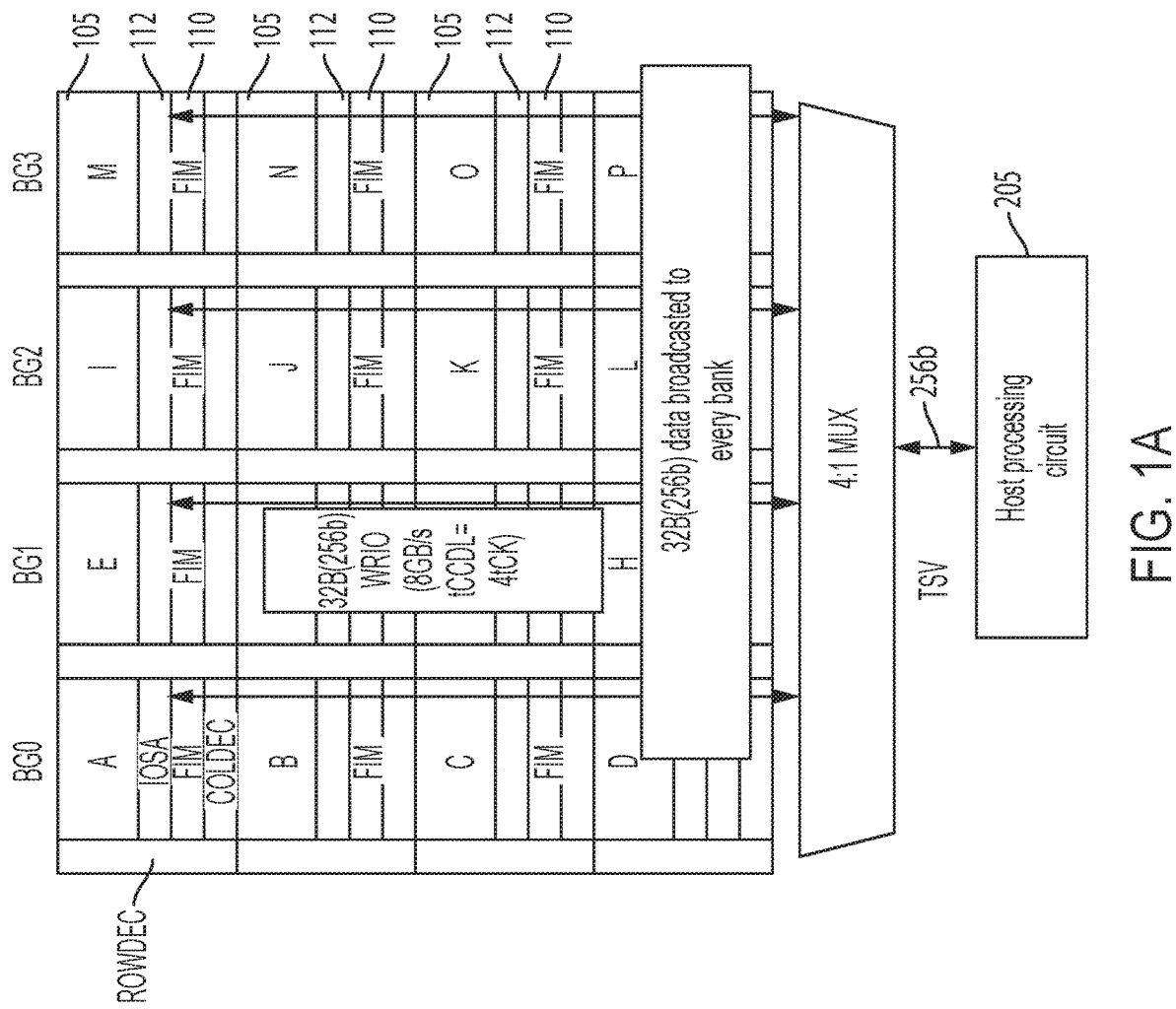
FIG. 1A is a block diagram of a memory including a plurality of bank groups each including a plurality of banks, the memory further including a plurality of function in memory circuits, according to an embodiment of the present disclosure.

Referring to FIG. 1A, in some embodiments, a memory (e.g., a high bandwidth memory (HBM) or dual in-line memory module (DIMM)) may be arranged as a plurality of bank groups (BG0, BG1, BG2, BG3) each including a plurality of banks 105 (with, e.g., BG0 including banks 105 labeled A, B, C, and D). Some features of FIG. 1A, such as through-silicon vias (TSV) are specific to HBM; other forms of memory (e.g., DIMM) may operate in an analogous manner, however. DRAM memory may be organized into ranks, chips, and banks 105. A "rank" may be a portion of the memory that has a shared chip-select pin. Each rank may include eight chips, and each chip may include 16 banks 105. The banks 105 of the chips may be organized into "megabanks", so that, for example, the set of banks 105 consisting of bank 0 from each of the eight chips in a rank may be megabank 0. The chips may be read in parallel, onto a 256-bit-wide bus, with each of the eight chips providing 32 bits of the 256 bits of data.

Figure 1B:
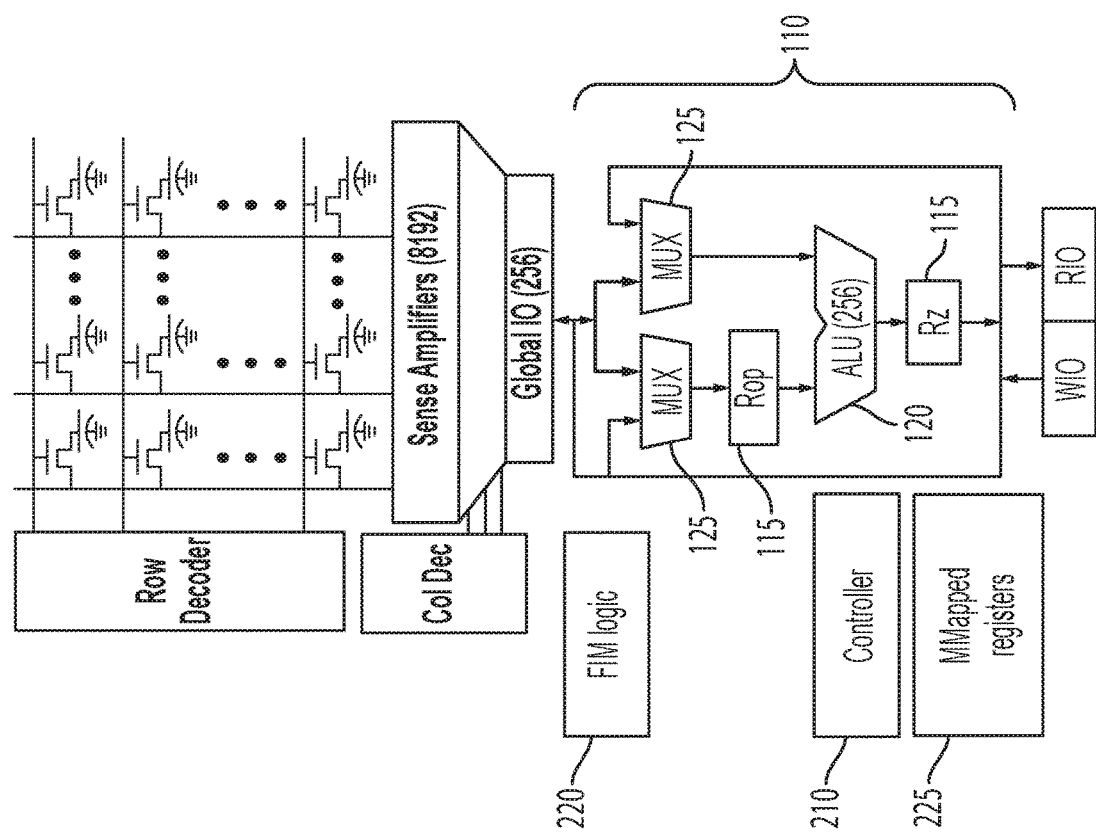
FIG. 1B is a block diagram of a memory bank with plurality of sense amplifiers, a global input output register, and a function in memory circuit, according to an embodiment of the present disclosure.

The memory may be connected to, and provide storage for, a host processing circuit 205 (e.g., a CPU or a GPU, or a CPU or a GPU with additional elements, such as a memory controller (MC)). In some embodiments, the host processing circuit 205 is on the host side of a network path (e.g., it is a host server). In an in-memory compute (IMC) system, each bank 105 may include an input/output sense amplifier 112 (IOSA), and a function in memory (FIM) circuit 110 (which may also be referred to as an "in-memory-compute circuit" or a "process in memory circuit"). As used herein, a function in memory circuit is a processing circuit that is capable of performing arithmetic operations or logical operations, and that is connected more directly to the memory than the host processing circuit 205 (and also more directly than an accelerator would be). For example, in a system in which memory is connected to the host processing circuit 205 by a DDR bus, a processing circuit on the memory side of the DDR bus may be considered a function in memory circuit, whereas a processing circuit (e.g., an accelerator on the host processing circuit side of the DDR bus, to which the host processing circuit 205 may delegate computing tasks) that is on the host processing circuit side of the DDR bus is not considered to be a function in memory circuit. FIG. 1B shows the structure of such a bank 105, in some embodiments, and FIG. 1C is a table showing a list of operations that may be performed by the function in memory circuit 110. In some embodiments, the host processing circuit 205 sends to the function in memory circuit 110 a number (e.g., a number between 0 and 9 corresponding to one of the rows of the table of FIG. 1C), and the function in memory circuit 110 then performs the corresponding operation. The instruction (or, equivalently, a number identifying the instruction) may be sent by the host processing circuit 205 to the function in memory circuit 110 through reserved-for-future-use (RFU) bits (e.g., RFU bits of a DDR interface).

As shown in FIG. 1B, the function in memory circuit 110 may include registers 115 (e.g., Rop and Rz), an arithmetic logic unit (ALU) 120, and multiplexers 125 (each labeled "MUX" in FIG. 1B), that together may be used to execute instructions (e.g., the instructions listed in the table of FIG. 1C). The function in memory circuit 110 may further include FIM logic 220, a controller 210, and memory-mapped registers 225 (discussed in further detail below). As shown in the table of FIG. 1C, the instructions may cause the function in memory circuit 110 to copy the contents of one register into another (e.g., instructions 0-5 and 9) or to perform an operation ("op") on the contents of two registers and to store the result in a third register (in the register Rz, in the case of the instruction set of the table of FIG. 1C). The operation may be an arithmetic operation (e.g., +, −, ×, or /, performed, for example, according to IEEE-754), or a logical operation (e.g., bitwise & (AND), | (OR), ^ (exclusive OR), or ~ (ones complement)). A register (e.g., one of the memory mapped registers 225) may specify the operation (e.g., the particular arithmetic operation or logical operation) to be performed when the instruction is one of instructions 6, 7, and 8 in the table of FIG. 1C. Returning to FIG. 1B, the arithmetic logic unit 120 may include a 16-lane, 16-bit floating point (FP-16) vector unit or an 8-lane, 32-bit floating point (FP-32) vector unit, making possible various operations. Non-limiting examples can include tensor operations (e.g., dot product, outer product, ReLU (rectifier, or rectifier linear unit), vsSqr (squaring the elements of a vector), and vsSQrt (taking the square root of each element of a vector)). For efficient use of the function in memory circuit 110, the data may be arranged in the memory so that multiple operands are concurrently available in the open row. As used herein, the "open row" refers to the data in the sense amplifiers 112 (after row activate is issued). The open row may, for example, include 8192 bits of data, from which the ALU may be able to read multiple operands (e.g., 32-bit operands).

The memory controller 206 (MC) of the host processing circuit 205 may be a memory controller complying with a standard for DRAM interfaces promulgated by the Joint Electron Device Engineering Council (JEDEC) and the BIOS of the host processing circuit 205; in such a case the memory controller 206 may implement no cache or limited cache. In some embodiments, the memory controller 206 may implement a different communication protocol that may not be JEDEC compliant, e.g., the timing constraints may be different, or the data bus, or the address and control bus, or both, could be split into two or more parts to provide a plurality of reduced-width buses. In some embodiments the memory controller 206 is transactional, i.e., instead of guaranteeing that the results of any memory access will be returned at a certain time, the host processing circuit 205 may wait until the memory controller 206 indicates that the requested data are ready. Instead of a cache hierarchy, the host processing circuit 205 may have only a scratchpad (for which cache coherency may not be required). In some embodiments, the host processing circuit 205 is connected to more than one memory, e.g., to a first memory that includes function in memory circuits 110 and for which no cache is present, and a second memory that lacks function in memory circuits and for which a cache hierarchy is present.

In operation, the host processing circuit 205 may first write operand values to the memory. This may involve broadcasting values to multiple banks (e.g., banks 105), as shown in FIG. 1A. Such broadcasting may reduce the number of write cycles used when an operand is re-used multiple times (e.g., in a matrix multiplication, in which each row of a first matrix may be multiplied by each column of a second matrix). The host processing circuit 205 may then cause processing to be performed in the memory by sending the addresses of operands to the memory (causing the contents of the addressed memory locations to be read into the global input output (global 10) register) and sending instructions (e.g., a number between 0 and 9, identifying one of the instructions in the table of FIG. 1C) to the function in memory circuit 110.

For example, the function in memory circuit 110 may perform a multiplication of a first operand and a second operand, and return the product to the host processing circuit 205, as follows. The host processing circuit 205 may send the address of the first operand to the memory (causing the first operand to be read into the global 10 register), and send the number 0 (identifying instruction 0, in the table of FIG. 1C) to the function in memory circuit 110. The function in memory circuit 110 may then, upon receipt of instruction 0, store the first operand in the Rop register (e.g., copy it from the global 10 register to the Rop register). The host processing circuit 205 may then send the address of the second operand to the memory (causing the second operand to be read into the global 10 register), and send the number 6 (identifying instruction 6, in the table of FIG. 1C) to the function in memory circuit 110. The function in memory circuit 110 may then, upon receipt of instruction 6, calculate the product ("op" being multiplication in this case) of the two operands (the first operand being in the Rop register and the second operand being in the general 10 register) and store the product in the register Rz. Finally, the host processing circuit 205 may send the number 5 (identifying instruction 5, in the table of FIG. 1C) to the function in memory circuit 110, causing the product (stored in the Rz register) to be written to the DQ output (i.e., returned to the host processing circuit 205).

As another example, the function in memory circuit 110 may perform a multiplication of a first operand and a second operand, and store the product in the memory, by following the same sequence of steps, except that the final instruction may be instruction number 3 (identifying instruction 3, in the table of FIG. 1C), causing the product to be written back to the memory (instead of being returned to the host processing circuit 205) at a location specified by an address concurrently sent to the memory by the host processing circuit 205.

Figure 2A:
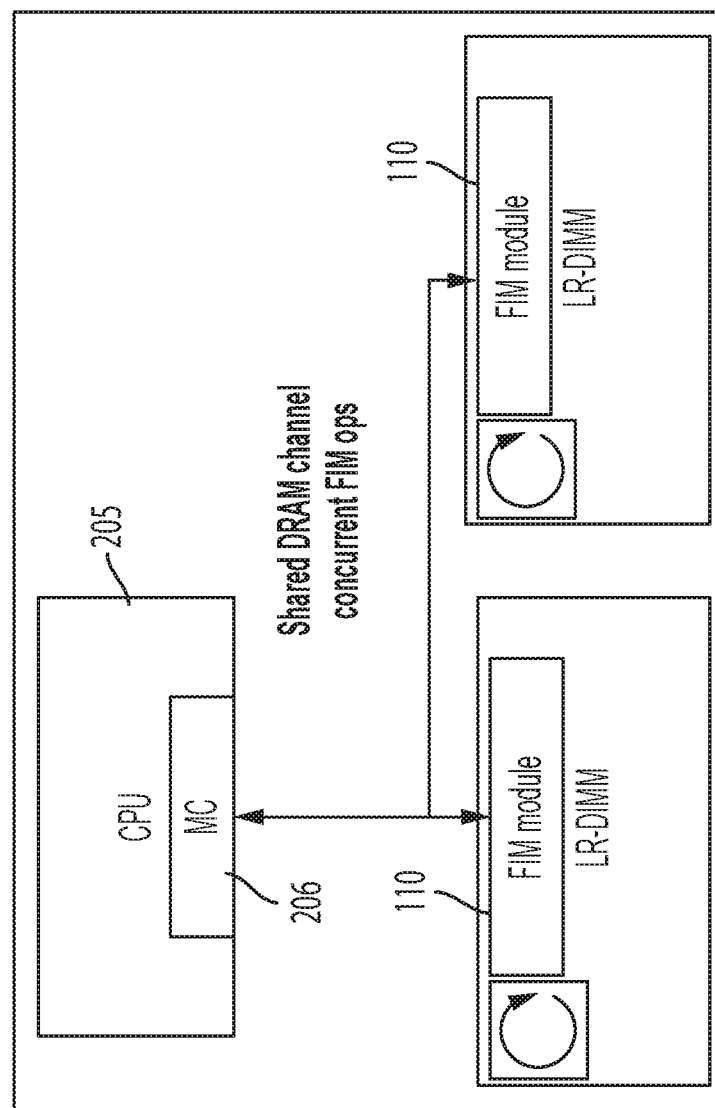
FIG. 2A is a block diagram of a function in memory configuration using a plurality of standard dynamic random-access memory (DRAM) modules, each connected to a function in memory circuit, the DRAM modules sharing a channel to a host processing circuit, according to an embodiment of the present disclosure.
Figure 2B:
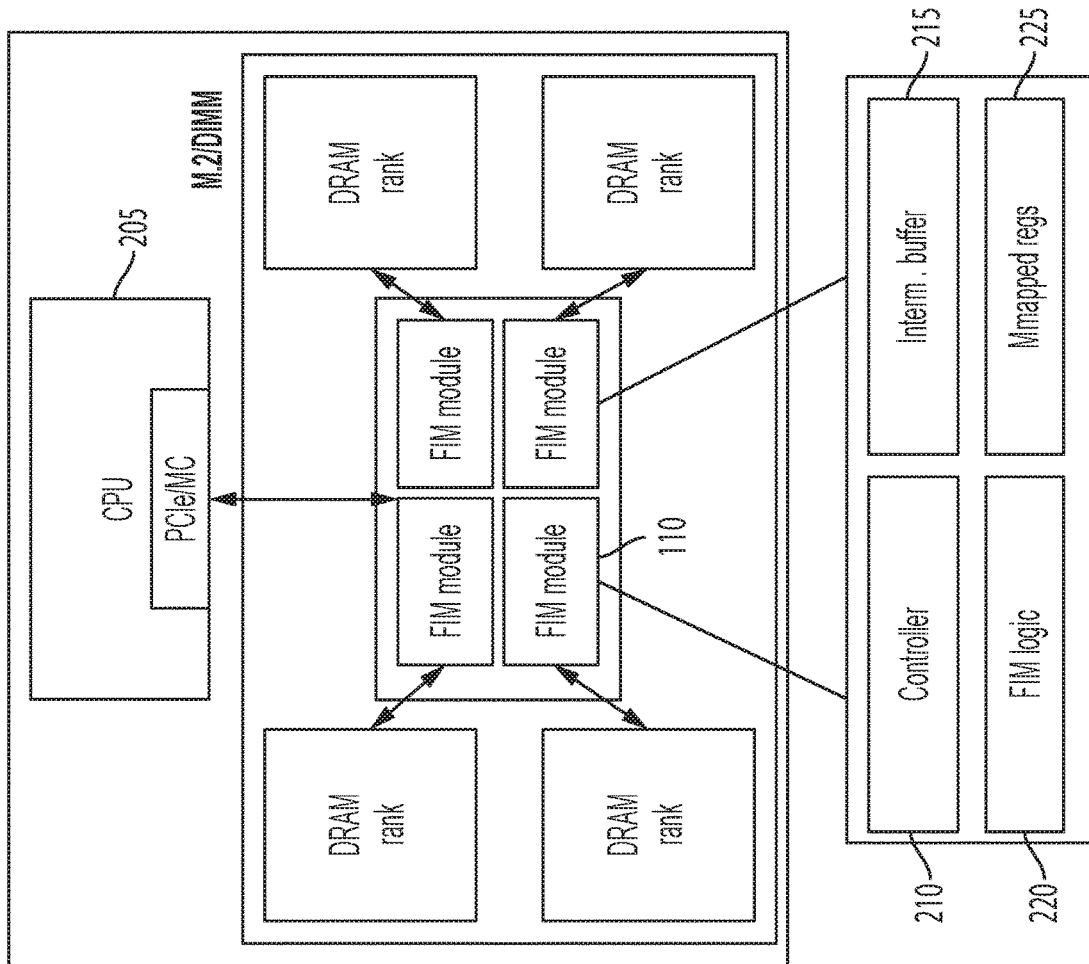
FIG. 2B is a block diagram of a function in memory configuration using a plurality of standard DRAM modules arranged in a plurality of ranks, each rank connected to a function in memory circuit, according to an embodiment of the present disclosure.

FIGS. 2A and 2B illustrate two configurations in which function in memory circuits 110 are implemented with standard dynamic random-access memory (DRAM) chips (i.e., without modifying the DRAM chips for use with the function in memory circuits 110). Although in some contexts a configuration such as this may be termed "function near memory", as used herein, the term "function in memory" includes configurations (such as those of FIGS. 2A and 2B) in which the function in memory circuit 110 is on a separate semiconductor chip from the memory. In the embodiment of FIG. 2A, several (e.g., two) DIMM modules share a channel to the host processing circuit 205 (which includes a CPU and a memory controller (MC)). Each of the DIMM modules includes a function in memory circuit 110 (or "FIM module"). The DIMM modules may be load-reduced DIMM (LR-DIMM) modules, to facilitate the sharing of the channel. In the embodiment of FIG. 2B, each of several ranks of a memory module is associated with a respective function in memory circuit 110. Each of the FIM modules in FIGS. 2A and 2B may include a controller 210, an intermediate buffer 215 (of which the Rop register of FIG. 1B may be an example), FIM logic 220, and memory-mapped registers 225. The memory of FIG. 2B may be in an M.2 or DIMM form factor. In the configuration of FIG. 2B, the function in memory circuit 110 may be fabricated on the buffer chip, which in a DIMM without function in memory circuits may be a chip that primarily performs retiming.

Figure 2C:
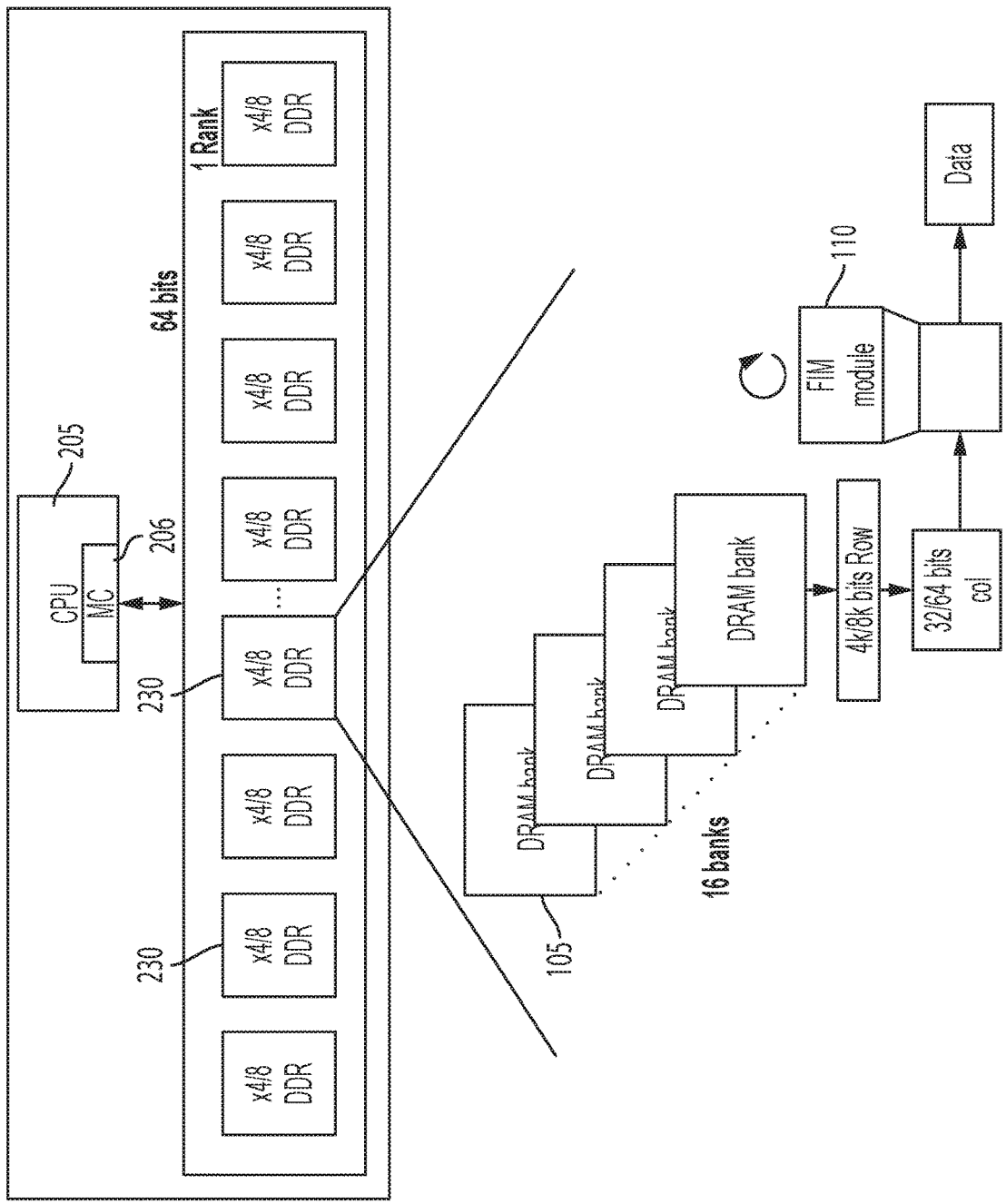
FIG. 2C is a block diagram of a function in memory configuration using a plurality of modified DRAM chips, each chip including a function in memory circuit, according to an embodiment of the present disclosure.
Figure 2D:
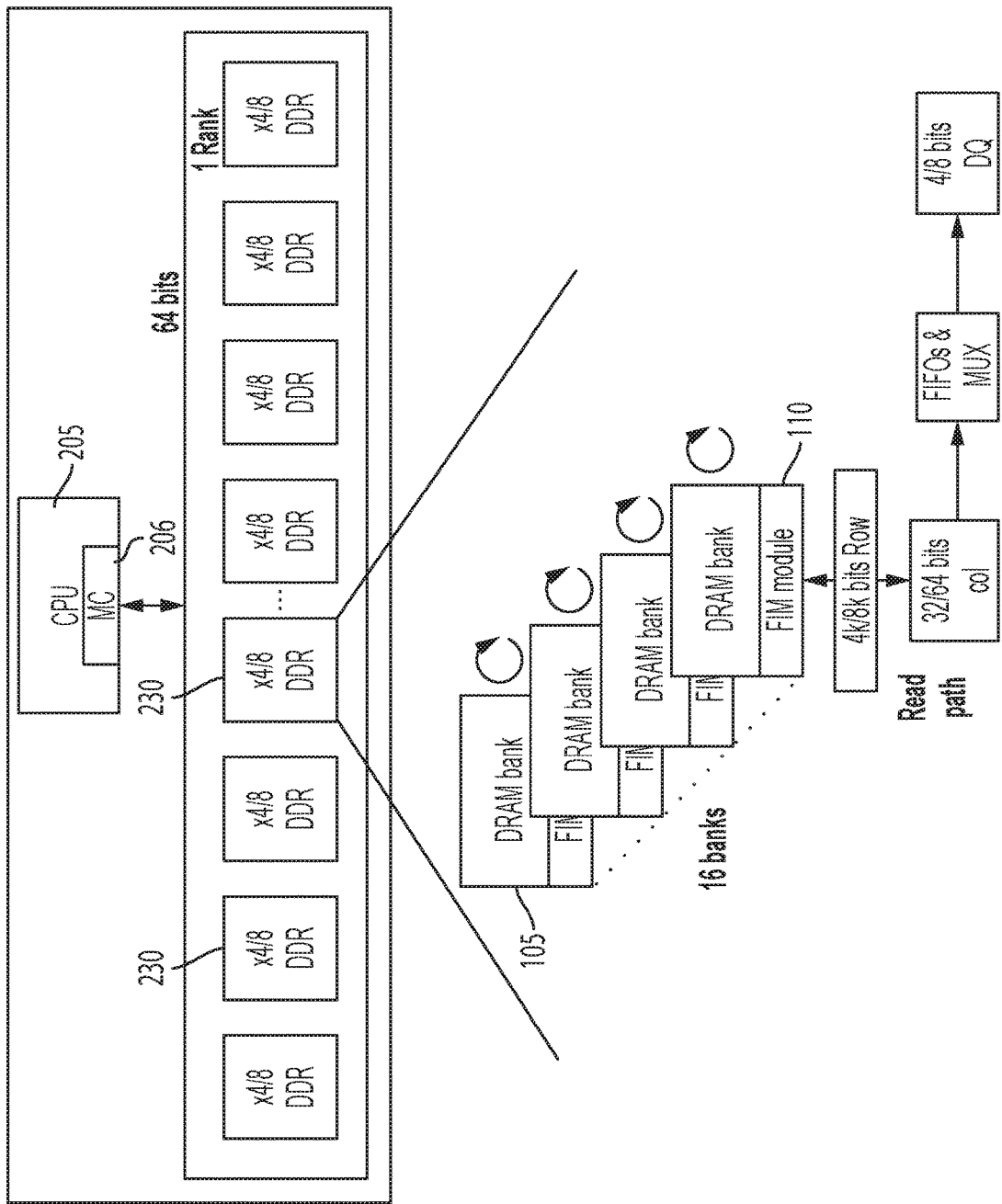
FIG. 2D is a block diagram of a function in memory configuration using a plurality of modified DRAM chips, each chip including a plurality of DRAM banks and a function in memory circuit for each bank, according to an embodiment of the present disclosure.

FIGS. 2C and 2D illustrate two different configurations in each of which function in memory circuits 110 are on the same chips (e.g., fabricated on the same silicon chips) as the DRAM. In the embodiment of FIG. 2C, each chip 230 includes a function in memory circuit 110. The configuration of FIG. 2C does not affect the DRAM core, and, in part for this reason, may be simpler to implement than the configuration of FIG. 2D. Moreover, routing (which may be challenging to accomplish with a limited number of metal layers in the configuration of FIG. 2D) may be simpler in the configuration of FIG. 2C. The configuration of FIG. 2C is logically similar to the configuration of FIG. 2B, in the sense that in each of these two configurations, a plurality of DRAM banks is connected to, and used by, a function in memory circuit 110. The configurations of FIGS. 2C and 2D may reduce the complexity of the buffer chip (compared to a configuration in which the function in memory circuit 110 is fabricated on the buffer chip). In the embodiments of FIG. 2C and 2D, each chip 230 may be only slightly larger than a standard memory chip and, because there are no separate chips for the function in memory circuits 110, the chips 230 may be more readily accommodated in a standard form factor (e.g., on a DIMM) than the embodiments of FIGS. 2A and 2B, in which the function in memory circuits 110 are on separate chips from the DRAM, and therefore the chips (the DRAM chips and the chips containing the function in memory circuits 110) may occupy more board space. In the embodiment of FIG. 2C, each function in memory circuit 110 accesses only one memory chip, and the cacheline may be entirely within one chip 230 (i.e., data may not be striped across multiple chips 230; such striping would make it difficult for the function in memory circuit 110 to perform useful operations).As used herein, "cacheline" means the granularity with which the host processing circuit 205 accesses memory (i.e., reads from memory and writes to memory). For example the cacheline may be 64 bytes for a CPU and the cacheline may be 128 bytes fora GPU.

In the embodiment of FIG. 2D, each memory bank 105 has associated with it a function in memory circuit 110, so that each chip 230 contains several (e.g., 16) function in memory circuits 110. The embodiment of FIG. 2D may include a larger number of function in memory circuits 110 than the embodiment of FIG. 2C and accordingly may exhibit better performance than the embodiment of FIG. 2C. The changes to the 10 path of each bank (as shown in FIG. 1B, which also illustrates a configuration with one function in memory circuit 110 for each bank of memory), may consume more chip area than, and the complexity of the design may be greater than, e.g., that of the embodiment of FIG. 2C, in part because of the challenges of accomplishing the signal routing with a limited number of metal layers. In the embodiment of FIG. 2D, the function in memory circuits 110 in each bank 105 may operate, at any time, on the same address, because too few DRAM control bits may be available to make independent address selection feasible.

Data flow between function in memory circuits 110 may occur in various ways. In some embodiments, the function in memory circuits 110 and their associated portions of memory may be configured as a single instruction, multiple data (SIMD) parallel processor, as illustrated in FIG. 3A. Each of the function in memory circuits 110 may, at any time, perform the same instruction as the other function in memory circuits 110, with a different operand or with different operands. After each operation, the results of the operation may be returned to the host processing circuit 205 or saved in the memory, as discussed above in the context of FIG. 1B.

In some embodiments, the function in memory circuits 110a, 110b, 110c (collectively referred to as function in memory circuits 110) and their associated portions of memory may be configured as a systolic array, which can refer to a homogeneous network of tightly-coupled data processing circuits, as illustrated in FIG. 3B. In such an embodiment, the result of each operation of a first function in memory circuit 110a may be passed on, as an argument for a subsequent operation, to a subsequent, second function in memory circuit 110b in the network. In some embodiments, each bank group can be connected to a respective chain of function in memory circuits 110, as illustrated in FIG. 3B, and there are no connections between the chains. The data paths between banks 105 within each bank group may already be present in standard memory architectures (e.g., DIMM or HBM), although the logic for communicating between connected function in memory circuits 110 may not be present; such logic may be added, if the configuration of FIG. 3B is to be used. The logic may include additional conductors between connected function in memory circuits 110, that may be employed, for example, by the first function in memory circuit 110a to notify its downstream neighbor, the second function in memory circuit 110b, that data on the common bus is intended for the downstream neighbor. The function in memory circuits 110 may be connected to a common bus, and it may only be possible for one of the function in memory circuits 110 at a time to drive the bus. As such, suitable logic and arbitration may be used to enable communications between the function in memory circuit 110 while avoiding bus contention. The embodiment of FIG. 3B may be poorly suited to some computations. The embodiment of FIG. 3B, however, may have the advantage, for computations for which it is suited, that the host processing circuit 205 is not burdened with intermediate results, as it may be if a similar computation were instead performed with the embodiment of FIG. 3A. In some embodiments, a system according to FIG. 3A or according to FIG. 3B may be employed to perform, or to perform parts of, basic linear algebra subprograms (BLAS) level 1 (BLAS1), or level 2 (BLAS2), or general matrix multiplication (GEMM) (which may be part of BLAS3). To perform a GEMM calculation, the system may select the order of the loops executed so as to maximize parallelism. A system according to FIG. 3A or according to FIG. 3B may also be capable of performing operations on transposed operands (e.g., it may be capable of calculating the matrix products AB, ATB, or ABT), without the host processing circuit 205 first having re-ordered the data in memory.

In some embodiments, a task analyzer may assess the suitability, for execution by the function in memory circuits 110, of various computing tasks to be executed. As used herein, a "task analyzer" is a circuit or a piece of code that analyzes code to be executed, and classifies it as either (i) code that is likely to be executed most efficiently on the host processing circuit 205 or on an accelerator (if an accelerator is present), or (ii) code that is likely to be executed most efficiently by function in memory circuits 110. As used herein, a "computing task" is any collection of operations to be performed by a computer; as such, a computing task may consist of, or include, a plurality of smaller computing tasks.

Figure 4:
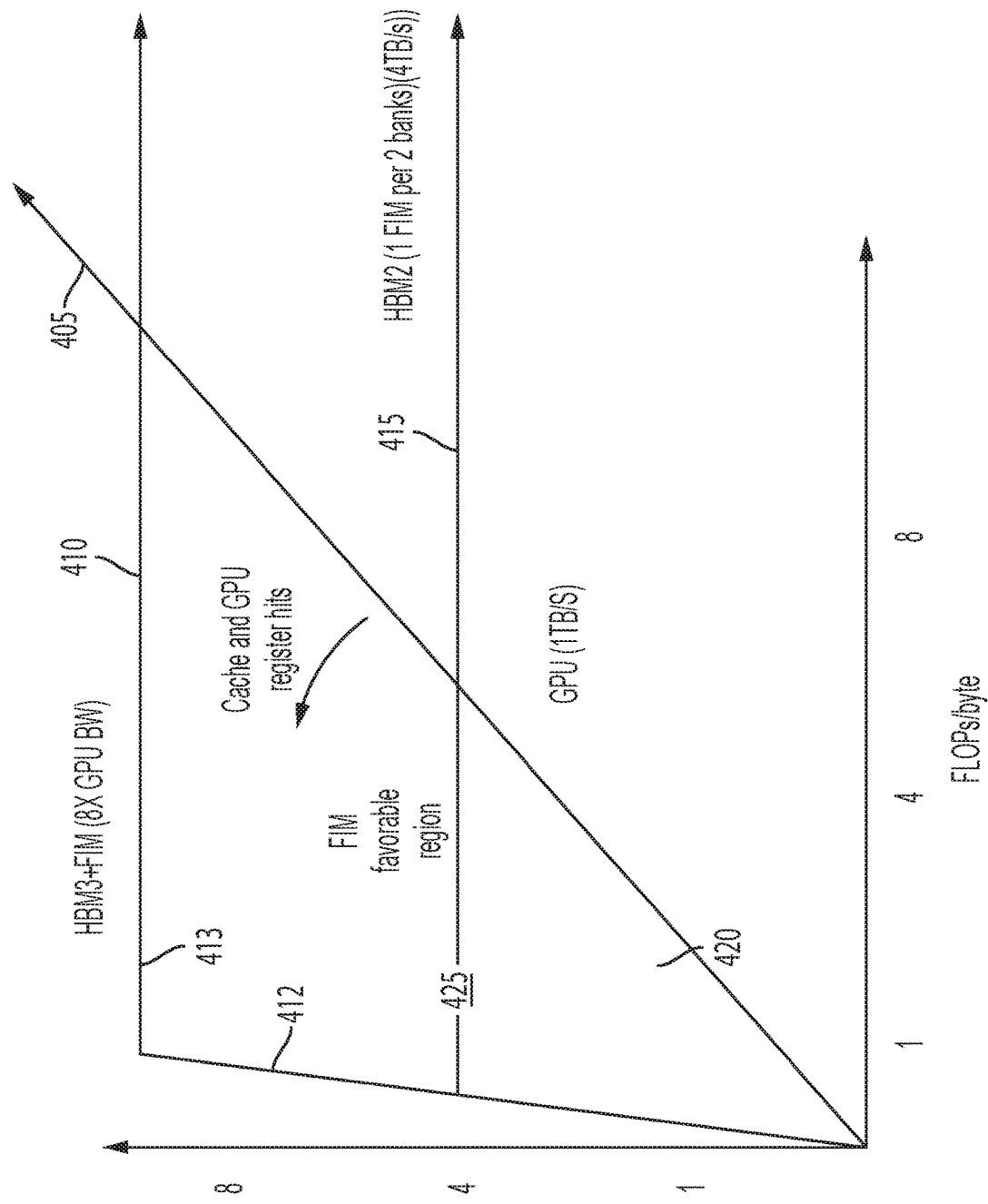
FIG. 4 is a graph showing performance curves of a graphics processing unit and of arrays of function in memory circuits, according to an embodiment of the present disclosure.

FIG. 4 shows performance curves for three example hardware configurations. A first curve 405 shows the performance of a first hardware configuration, consisting of a GPU. The GPU may include processing hardware suited for high speed calculations, but some such calculations may be memory-bound, i.e., the GPU's performance may be limited by the rate at which it is able to retrieve data from and store data to memory. As such, the larger the number of floating-point operations (FLOPs) that are performed for each byte of data retrieved from and stored in memory, the greater the number of FLOPs the GPU is able to perform per unit time.

As used herein, the "number of floating-point operations per byte retrieved from memory and per byte stored in memory" for a computing task means F/(R+S) where F is the number of floating-point operations performed by the computing task, R is the number of bytes read from memory by the computing task and S is the number of bytes stored in memory by the computing task. This characteristic is illustrated in the performance curve of the GPU, which is a straight line indicating that the rate of performing calculations is directly proportional to the number of FLOPs per byte.

A second curve 410 shows the performance of a second hardware configuration, consisting of HBM3 memory with function in memory circuits 110. This hardware configuration may instead be limited in most cases by processing power, in part because the processes used to fabricate memory may not be suitable for fabricating high-speed processing circuits (the function in memory circuit 110 may, for example, run with a clock frequency that is 2-3.6 time lower than the clock frequency of the host processing circuit 205), and in part because the chip area available for the function in memory circuits 110 may be smaller than the chip area of a GPU. This hardware configuration, however, may be limited by memory bandwidth to a significantly smaller extent, as evidenced by the significantly steeper slope of the sloped portion 412 of the second curve 410. The maximum rate at which this configuration performs calculations is about 8 teraFLOPs (TFLOPs) per second, as illustrated by the horizontal portion 413 of the second curve 410; this rate corresponds to all of the function in memory circuits 110 operating at full capacity. The triangular region 425 labeled "FIM favorable region" is a region in which the second hardware configuration is expected to outperform the first hardware configuration.

A third curve 415 shows the performance of a second hardware configuration, consisting of HBM2 memory with a function in memory circuit 110 for every two banks 105 of memory. This hardware configuration has fewer function in memory circuits 110 than the second hardware configuration, resulting in a performance curve that is similar to that of the second hardware configuration but with a maximum performance rate of about 4 TFLOPs per second, i.e., about half of that of the second hardware configuration. A smaller triangular region 420 shows the region in which the third hardware configuration is expected to outperform the first hardware configuration.

Based in part on the observations that may be drawn from the graph of FIG. 4, the task analyzer may calculate or assess one or more measures of comparative performance and calculate an "advantage score" of a first computing task. The advantage score may be a measure of the extent to which the computing task is capable of more efficient execution by a plurality of function in memory circuits 110 than by one or more extra-memory processing circuits. As used herein, an "extra-memory processing circuit" is a processing circuit (such as the host processing circuit 205, the GPU, or an accelerator connected to the host processing circuit 205 and possibly also to the memory) that is not a function in memory circuit 110.

The advantage score may be used to decide whether a certain computing task (a "candidate computing task") being considered for execution by the function in memory circuits 110 will be performed by the function in memory circuits 110. For example, the advantage score may be the (calculated or estimated) ratio of (i) the time required to complete the computing task if it is performed by an extra-memory processing circuit to (ii) the time required to complete the computing task if it is performed by the function in memory circuits 110. The advantage score may be compared to a threshold (e.g., to 1.0), and if the advantage score exceeds the threshold, the computing task may be performed by the function in memory circuits 110; otherwise it may be performed by one or more extra-memory processing circuits, e.g., by the host processing circuit 205.

In some embodiments, the ability of the host processing circuit 205 to perform other tasks while the function in memory circuits 110 are performing operations may be taken into account when a decision is made regarding whether the computing task is to be performed by the function in memory circuits 110. For example, the threshold mentioned above may be set to a value less than 1.0 (e.g., to 0.9 or 0.8) so that the function in memory circuits 110 are used to perform the computing task even if doing so results in the computing task taking somewhat longer to complete. In some embodiments, the ability of the function in memory circuits 110 to perform other tasks may be taken into account when a decision is made regarding whether the computing task is to be performed by the function in memory circuits 110. For example, if there are several candidate computing tasks ready or nearly ready for execution by the function in memory circuits 110, an advantage score may be calculated for each, and, if the advantage score exceeds the threshold for several of the candidate computing tasks, the function in memory circuits 110 may execute the computing task for which the advantage score was greatest.

In some embodiments, the advantage score is the ratio of (i) the number of FLOPs per unit time performed in executing the candidate computing task (or performed in executing the computing tasks and any other concurrently executed computing tasks) if the candidate computing task is performed by the function in memory circuits 110 to (ii) the number of FLOPs per unit time performed in executing the candidate computing task (or performed in executing the computing tasks and any other concurrently executed computing tasks) if the candidate computing task is performed by one or more extra-memory processing circuits (e.g., by the host processing circuit 205). In such an embodiment, if the number of FLOPs per unit time performed in executing the computing tasks and any other concurrently executed computing tasks is used, the advantage score takes into account other computing work that may be performed by the hardware (e.g., by the function in memory circuits 110 or by the one or more extra-memory processing circuits) that is not performing the candidate computing task.

The advantage score may be calculated or estimated based on one or more measures of comparative advantage, each measure of comparative advantage being a measure for comparing the expected performance of (i) execution of the candidate computing task by the extra-memory processing circuits, and (ii) execution of the candidate computing task by the function in memory circuits 110.

For example, a first measure of comparative advantage may be inferred directly from the graph of FIG. 4, which shows that function in memory circuits 110 are most likely to outperform extra-memory processing circuits when the number of FLOPs per byte is small. For example, if the advantage score used is simply the reciprocal of the number of FLOPs per byte, then a threshold of ⅛ may be used, for the case represented by the first curve 405 and the second curve 410, e.g., the function in memory circuits 110 may be used to execute the computing task if the number of FLOPs per byte is less than 8, which corresponds to the value at which the performance curve of the extra-memory processing circuit (e.g., the GPU) crosses the performance curve of the function in memory circuits 110. If rank level (instead of bank level) function in memory circuits 110 are used, a threshold of ¼ may be used instead.

A second measure of comparative advantage may be cache hit rates. If cache hit rates are high, the slope of the performance curve 405 of the extra-memory processing circuit may become steeper (because a corresponding fraction of data retrieval and storage operations may be significantly faster), and the region 425, in the graph of FIG. 4, within which function in memory circuits 110 are more efficient than the extra-memory processing circuit may become smaller. This may have the effect of reducing the threshold number of FLOPs per byte below which execution by function in memory circuits 110 is likely to be more efficient (i.e., the threshold number of FLOPs per byte may be a decreasing function of the cache hit rate). In some embodiments, the advantage score may take into account both the first measure of comparative advantage (the number of FLOPs per byte) and the second measure of comparative advantage (the cache hit rate) and the advantage score may be a decreasing function of both, e.g., the advantage score may be smaller if the number of FLOPs per byte is large and the advantage score may be smaller if the cache hit rate is high. In some embodiments, the advantage score is the reciprocal of the product of the number of FLOPs per byte and the cache hit rate.

A third measure of comparative advantage may be the size (e.g., the total number of FLOPs) of the candidate computing task. If this size is large, the savings realized by executing the computing task in the function memory circuits 110 may be more likely to justify the overhead cost of arranging for its execution in the function in memory circuits 110. A fourth measure of comparative advantage involves the extent to which the computing task involves the regular computations and sequential access to which the function in memory circuits 110 are well suited. This may be quantified, for example, as the average aggregate number of FLOPs per unit time that the function in memory circuits 110 perform (or are expected to perform) while executing the candidate computing task. A fifth measure of comparative advantage involves the extent to which the computing task works well with x8 256-bit general purpose registers (GPRs), all-bank activation and precharge (ACT/PRE), GPU-HBM data-load limits, GPU program fence and other software limits. For example, the software may require a fence, to preserve cache coherency, when data are saved in memory to be processed by function in memory circuits 110; the overhead of executing the fence may therefore be taken into account when assessing whether the computing task will execute most efficiently in the function in memory circuits 110. The fifth measure of performance may be quantified as the reciprocal of the total time taken (including any time spent on overhead tasks) to complete the execution of the candidate computing task if it is performed by the function in memory circuits 110.

The advantage score may be calculated from one or more of the measures of comparative advantage. For example, the advantage score may be a sum of one or more respective values, or a product of one or more respective values, each of the respective values being based on a respective measure of comparative advantage. For example, a first one of the respective values may be equal to the first measure of comparative advantage, or it may be equal to (i) 1 if the first measure of comparative advantage exceeds a respective threshold (e.g., ⅛) and (ii) 0 if the first measure of comparative advantage does not exceed the respective threshold. More generally, each of the respective values may be equal to the corresponding measure of comparative advantage or to a function of the corresponding measure of comparative advantage (e.g., a polynomial function of the corresponding measure of comparative advantage, a constant weight times the corresponding measure of comparative advantage, or a function that returns 1 when the corresponding measure of comparative advantage exceeds a respective threshold and 0 otherwise).

The task analyzer may be executed, by a processing circuit (e.g., by the host processing circuit 205, or by another processing circuit) at compile time (e.g., using static analysis of the source code or of the object code), or it may be executed (by a processing circuit) at run time. For example, if a large computation task includes multiple smaller tasks that are analogous to each other (e.g., executions of multiple similar layers of a neural network, or the classification, by a neural network of each a plurality of images), then a first one of the smaller tasks may be executed initially in the host processing circuit 205 (or in an accelerator) and performance counters of the host processing circuit 205 may be used to assess whether the computing task will execute most efficiently in the function in memory circuits 110 (e.g., by calculating the advantage score of the first one of the smaller tasks, based on values of the performance counters). If so, subsequent analogous smaller tasks may then be executed in the function in memory circuits 110. As used herein, a second computing task is "analogous" to a first computing task if the operations performed by the two tasks are the same (although the data may be different).

Figure 5:
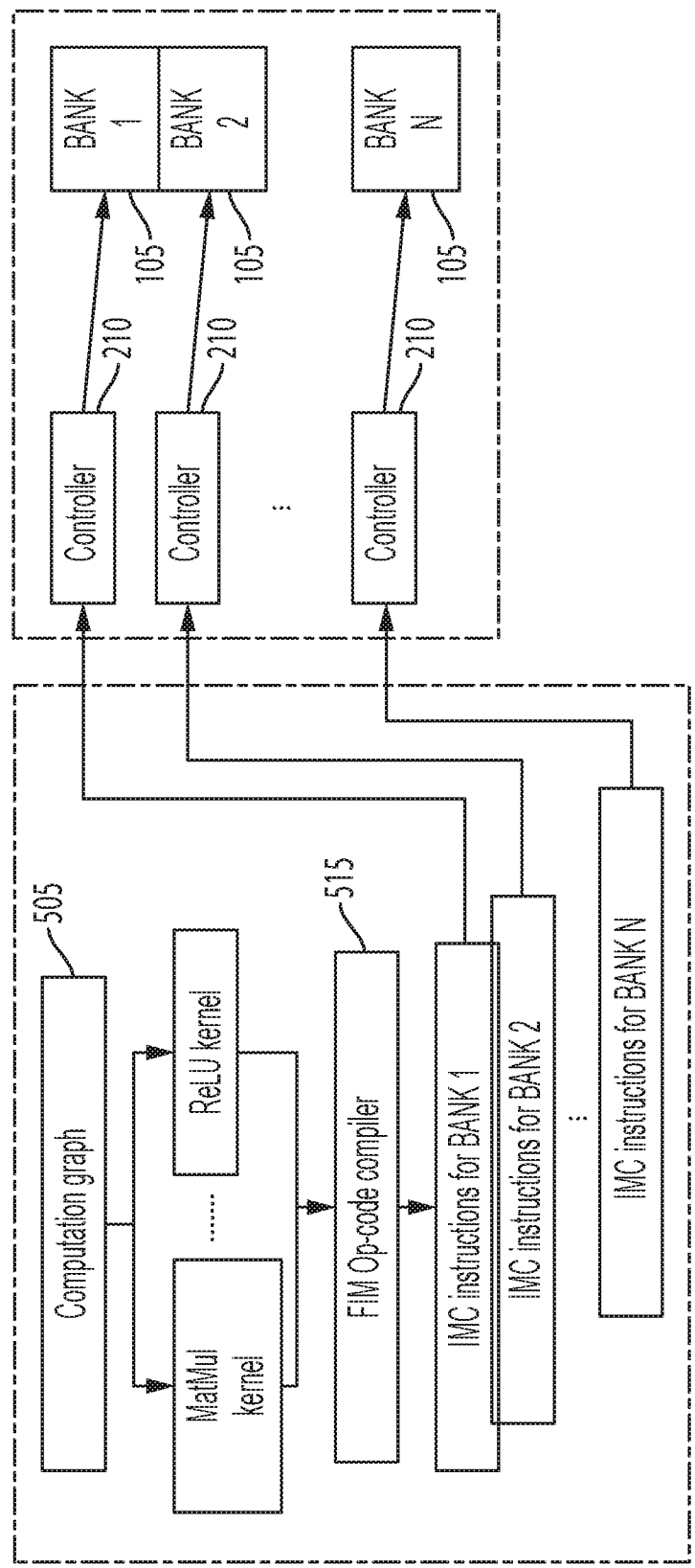
FIG. 5 is a flow diagram corresponding to execution based on a computation graph, according to an embodiment of the present disclosure.

Referring to FIG. 5, in some embodiments, a large computing task (e.g., a large computing task represented by a computation graph) may include a plurality of smaller computing tasks (e.g., a matrix multiplication ("MatMul") kernel and a rectifier linear unit (ReLU) kernel). To execute a computing task (e.g., the matrix multiplication kernel) in the function in memory circuits 110, an op-code compiler 515 may instrument the code (e.g., object code or source code for the computing task) (i) with instructions (e.g., instructions from the table of FIG. 1C) for execution by the function in memory circuits 110 and (ii) with data formatting instructions causing the host processing circuit 205 to format the data for the function in memory circuits 110, i.e., causing the data upon which the function in memory circuits 110 are to act to be present in the memory in an arrangement that allows for efficient processing by the function in memory circuits 110. For example, if multiple vector dot products are to be calculated (e.g., as part of a matrix multiplication), the data formatting instructions may arrange for all of the first operand vectors to be in sequential memory locations so that they may be in an open row of the memory at the same time (and loaded into a plurality of function in memory circuits 110 at the same time). Further, the data formatting instructions may similarly arrange for all of the second operand vectors to be in sequential memory locations so that they too may be in an open row of the memory at the same time (and loaded into the plurality of function in memory circuits 110 at the same time).

Figure 6:
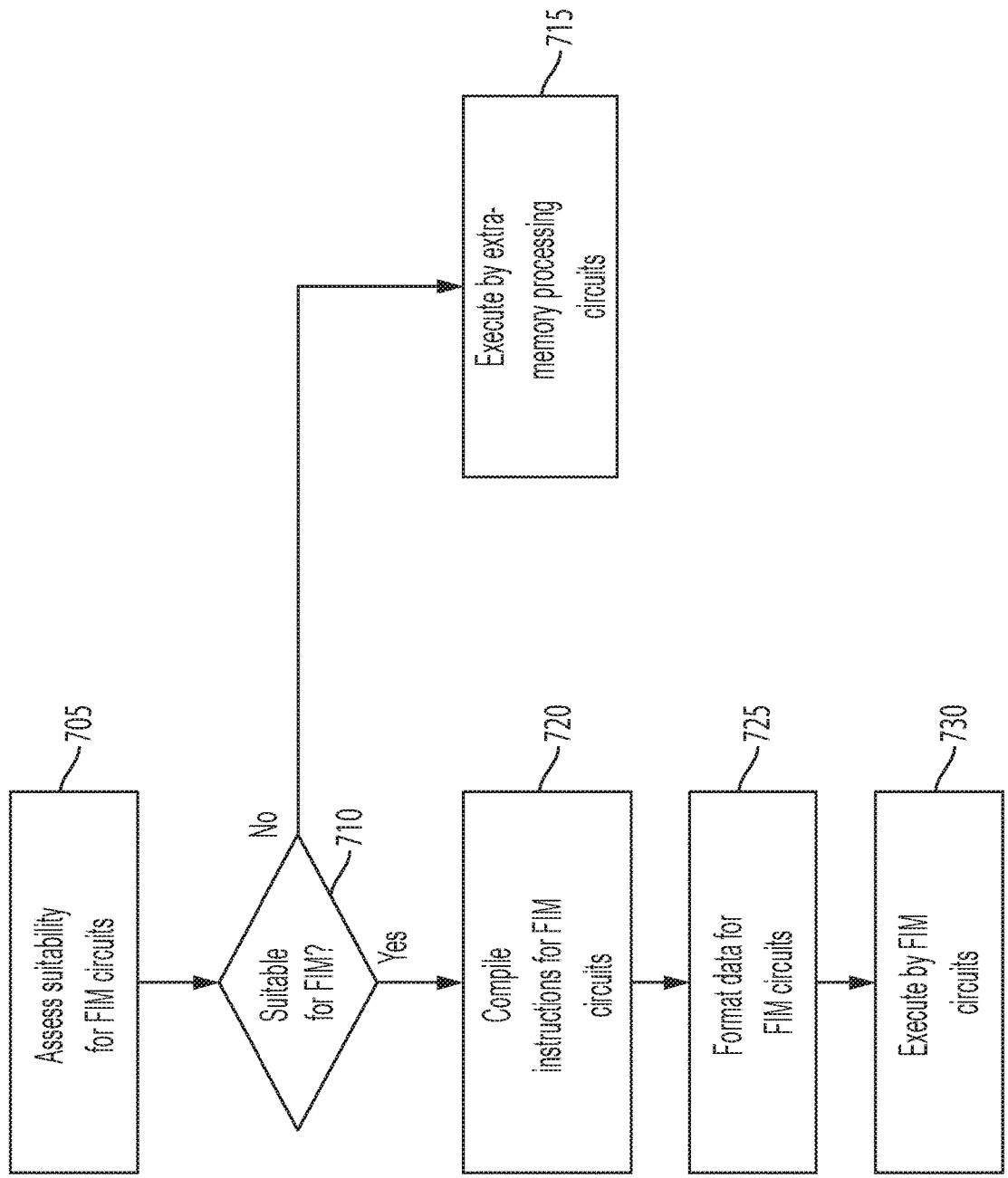
FIG. 6 is a flow chart of a method for computing using function in memory circuits, according to an embodiment of the present disclosure.

FIG. 6 is a flow chart of a method for computing using function in memory circuits 110, in some embodiments. The system may, at 705, assess the suitability of a computing task for execution by function in memory circuits 110. If, at 710, it is determined that the computing task is not suitable for execution by function in memory circuits 110, the computing task is executed, at 715, by extra-memory processing circuits. Otherwise, the instructions are compiled, at 720, for execution by the function in memory circuits, the data are formatted, at 725, for the function in memory circuits, and the computing task is executed, by the function in memory circuits, at 730.

As used herein, the term "or" should be interpreted as "and/or", such that, for example, "A or B" means any one of "A" or "B" or "A and B". It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

As used herein, when a method (e.g., an adjustment) or a first quantity (e.g., a first value) is referred to as being "based on" a second quantity (e.g., a respective measure of comparative advantage) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of a system and method for in-memory compute have been specifically described and illustrated herein, many modifications and variations will be apparent to those skilled in the art. Accordingly, it is to be understood that a system and method for in-memory compute constructed according to principles of this disclosure may be embodied other than as specifically described herein. The invention is also defined in the following claims, and equivalents thereof.

What is claimed is:

1. A method for computing, the method comprising:
    calculating an advantage score of a first computing task, the advantage score being a measure of an extent to which a plurality of function in memory circuits is capable of executing the first computing task more efficiently by than one or more extra-memory processing circuits, the first computing task comprising instructions and data;
    in response to determining that the advantage score of the first computing task is less than a first threshold, executing the first computing task by the one or more extra-memory processing circuits; and
    in response to determining that the first computing task is at least equal to the first threshold:
        compiling the instructions for execution by the function in memory circuits;
        formatting the data for the function in memory circuits; and
        executing the first computing task, by the function in memory circuits.

2. The method of claim 1, wherein the advantage score is based on one or more measures of comparative performance for comparing the expected performance of:
    execution of the first computing task by the extra-memory processing circuits, and
    execution of the first computing task by the function in memory circuits.

3. The method of claim 2, wherein a measure of comparative performance of the one or more measures of comparative performance is an average number of floating-point operations per byte retrieved from memory and per byte stored in memory.

4. The method of claim 2, wherein a first measure of comparative performance of the one or more measures of comparative performance is a cache hit rate during execution of the first computing task by the extra-memory processing circuits.

5. The method of claim 4, wherein a second measure of comparative performance of the one or more measures of comparative performance is an average number of floating-point operations per byte retrieved from memory and per byte stored in memory.

6. The method of claim 5, wherein the advantage score is a decreasing number of the first measure of performance and a decreasing function of the second measure of performance.

7. The method of claim 2, wherein a measure of comparative performance of the one or more measures of comparative performance is the total number of floating-point operations of the first computing task.

8. The method of claim 1, wherein the calculating of the advantage score of the first computing task comprises calculating the advantage score of the first computing task by static analysis of source code for the first computing task.

9. The method of claim 1, wherein the calculating of the advantage score of the first computing task comprises calculating of the advantage score of the first computing task at run time.

10. The method of claim 9, wherein the calculating of the advantage score, of the first computing task, at run time, comprises:
    executing a second computing task, analogous to the first computing task, on the extra-memory processing circuits; and
    calculating an advantage score, of the second computing task, based on values of performance counters of the extra-memory processing circuits.

11. The method of claim 1, wherein the executing of the first computing task, by the function in memory circuits, comprises executing the first computing task, by the function in memory circuits arranged in a single instruction, multiple data configuration.

12. The method of claim 1, wherein the executing of the first computing task, by the function in memory circuits, comprises executing the first computing task, by the function in memory circuits arranged in a systolic configuration.

13. The method of claim 1, wherein a function in memory circuit of the plurality of function in memory circuits is on a semiconductor chip with a dynamic random-access memory.

14. The method of claim 1, wherein a function in memory circuit of the plurality of function in memory circuits comprises:
    a plurality of registers,
    a plurality of multiplexers, and
    an arithmetic logic unit.

15. A system for computing, comprising:
    a host processing circuit; and
    a memory comprising a plurality of function in memory circuits,
    the host processing circuit being configured to:
        calculate an advantage score of a first computing task, the advantage score being a measure of an extent to which a plurality of function in memory circuits is capable of executing the first computing task more efficiently by than one or more extra-memory processing circuits, the first computing task comprising instructions and data;

in response to determining that the advantage score of the first computing task is less than a first threshold, execute the first computing task by the one or more extra-memory processing circuits; and in response to determining that the first computing task is at least equal to the first threshold:
- compile the instructions for execution by the function in memory circuits;
- format the data for the function in memory circuits; and
- cause the first computing task to be executed by the function in memory circuits.

16. The system of claim 15, wherein the function in memory circuits are arranged in a single instruction, multiple data configuration.

17. The system of claim 15, wherein the function in memory circuits are arranged in a systolic configuration.

18. The system of claim 15, wherein a function in memory circuit of the plurality of function in memory circuits comprises:
- a plurality of registers,
- a plurality of multiplexers, and
- an arithmetic logic unit.

19. The system of claim 15, wherein the calculating of the advantage score of the first computing task comprises calculating of the advantage score of the first computing task by static analysis of source code for the first computing task.

20. A system for computing, comprising:

means for processing; and a memory comprising a plurality of function in memory circuits, the means for processing being configured to:
- calculate an advantage score of a first computing task, the advantage score being a measure of an extent to which a plurality of function in memory circuits is capable of executing the first computing task more efficiently by than one or more extra-memory processing circuits, the first computing task comprising instructions and data;
- in response to determining that the advantage score of the first computing task is less than a first threshold, execute the first computing task by the one or more extra-memory processing circuits; and
- in response to determining that the first computing task is at least equal to the first threshold:
  - compile the instructions for execution by the function in memory circuits;
  - format the data for the function in memory circuits; and
  - cause the first computing task to be executed by the function in memory circuits.

\* \* \* \* \*